Dec. 28, 1965   B. L. TOLER   3,225,648
APPARATUS FOR PROJECTING TRANSPARENCIES AND OPACITIES
Filed Dec. 3, 1962   2 Sheets-Sheet 1
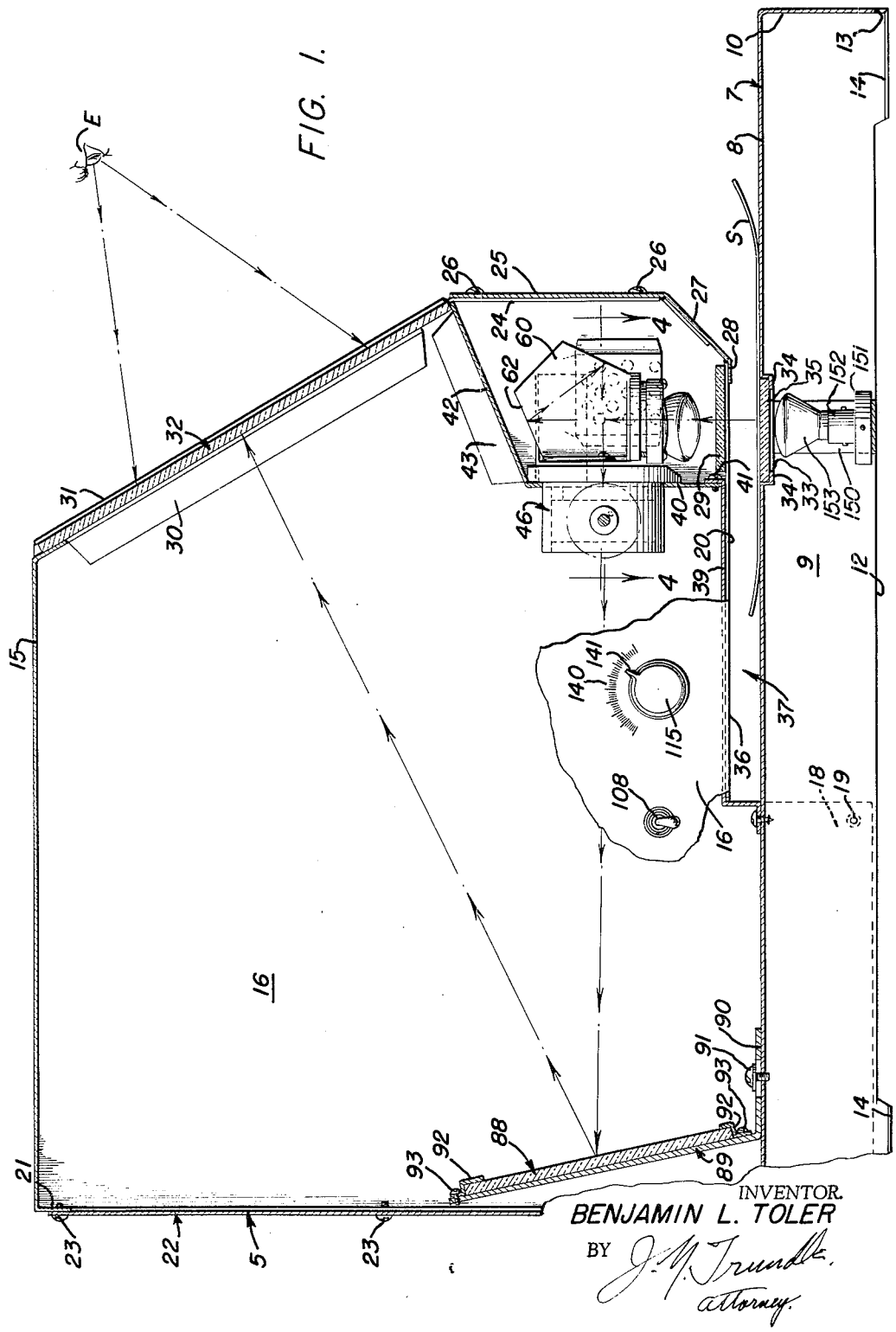
INVENTOR.
BENJAMIN L. TOLER Dec. 28, 1965  B. L. TOLER  3,225,648
APPARATUS FOR PROJECTING TRANSPARENCIES AND OPACITIES
Filed Dec. 3, 1962  2 Sheets-Sheet 2
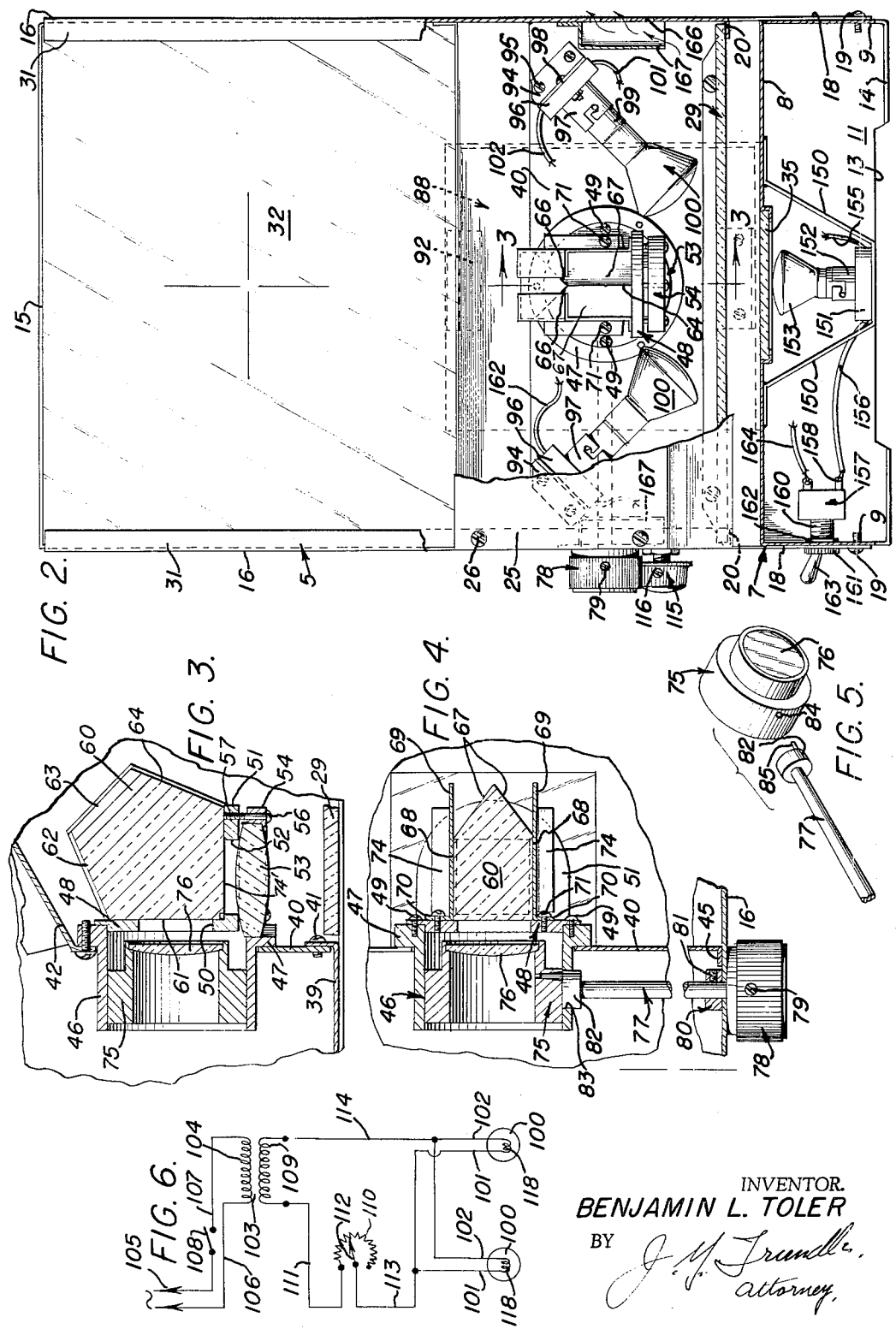
INVENTOR.
BENJAMIN L. TOLER United States Patent Office 3,225,648
Patented Dec. 28, 1965

3,225,648
APPARATUS FOR PROJECTING TRANSPARENCIES AND OPACITIES
Benjamin L. Toler, 502 Ridge Road SW., Vienna, Va.
Filed Dec. 3, 1962, Ser. No. 242,022
3 Claims. (Cl. 88—24)

The present invention relates to improvements in projecting apparatus, and more particularly to a projector for desk use for projecting a magnified image of solid and transparent objects onto a miniature frosted screen.

One object is to provide a projector which is adapted to be used in connection with identification data printed or otherwise marked on business index cards such as fingerprint index cards which contain a plurality of fingerprints with identifying data, and which is adapted to be inserted in the projector face side up so that the operator will have a clear view of the data on the index card and can properly manipulate the same to obtain the desired enlarged projection and may shift the card or other object in all directions to properly locate the data to be examined beneath the objective of a projector as set forth in the present invention.

Another object is to provide a projecting apparatus in which the picture image of the object is greatly magnified due to the increased optical distance obtained by a penta-roof prism, thus permitting an objective of greatly increased magnification to be used.

Another object is to provide a projecting apparatus which is adapted to accommodate sheets, cards and various other solid objects of different thickness and to provide means for focusing the projecting lens when objects of different thickness are being projected.

Another object is to provide a projecting apparatus having a projecting lens movable along the optical axis and manually operated by a control knob arranged externally of the casing within easy reach of the operator by the left hand, and thus permit the right hand to be used for positioning cards and other objects on the platform or stage beneath the objective.

Another object is to provide a projector having two separate light sources which can be selectively energized and permit the projection of solid as well as transparent objects.

Another object is to provide a projecting apparatus in which reflector type light bulbs are employed for directing a concentrated light beam in the area of the object to be viewed, and to provide means for controlling the supply of electrical energy thereto for regulating the image brightness when viewed externally on the miniature semi-transparent or frosted glass screen.

Another object is to provide a projector in which the projecting lens is movable along the optical axis of the projector and can be quickly and easily adjusted to a predetermined position and held against movement after being properly adjusted.

Another object is to provide a projecting apparatus which is completely enclosed within a compact casing structure of reduced dimensions, thus enabling the same to be used on an office desk without consuming a large amount of space but which is readily accessible when it is desired to project an enlarged image of a relatively small object for identification and other purposes.

Other objects and advantages of the invention will become apparent during the course of the following description of the accompanying drawings, wherein:

FIGURE 1 is a vertical cross-sectional view of the projecting apparatus illustrating the compact arrangement of the magnifying lens system and showing various structural details thereof.

FIG. 2 is a front elevational view of the projecting apparatus showing portions thereof broken away and in section to illustrate the unique arrangement of the illuminating system and illustrating ventilating means in the casing therefor.

FIGURE 3 is a vertical cross-sectional view taken on line 3—3 of FIGURE 2 and looking in the direction of the arrows to illustrate the optical system and the arrangement of the magnifying objective lens with respect to the penta-roof prism to thus increase the focal length of the system, but yet permit the objective lens to be closely spaced from the object being projected.

FIGURE 4 is a horizontal cross-sectional view taken on line 4—4 of FIGURE 1 and looking in the direction of the arrows to illustrate the manually operable adjustment for shifting the projecting lens along the optical axis of the system when focusing objects to be projected on the screen of various dimensions.

FIGURE 5 is an exploded perspective view showing the projector mount and the manner in which the control shaft is adapted to engage within an opening in the periphery thereof, and FIGURE 6 is a diagrammatic view of a simple shunt circuit for the illuminating means.

In the drawings, and more in detail, attention is directed to FIGURES 1 and 2 wherein there is shown a preferred embodiment of the invention, and wherein the reference character 5 will generally be employed to designate a projector casing of comparatively small dimensions which is capable of being placed on an office desk or the like, but yet consuming a comparatively small amount of space. The casing structure includes a base generally designated 7 formed of sheet metal or the like to provide a top wall 8 having vertical side walls 9 connected by vertical front and rear walls 10 and 11. The side walls 9 are cut away as at 12, while the front and rear vertical walls 10 and 11 are similarly cut away as at 13 to provide spaced projections 14 forming foot portions adapted to rest upon a suitable supporting surface.

The upper portion of the housing or casing 5 is formed of a sheet of relatively thin gauge metal angularly bent to provide a top wall 15 and vertical side walls 16. The vertical side walls 16 are provided with extensions 18 at the rear thereof which extend downwardly along the side walls 9 of the base 7 and are secured thereto by suitable threaded fasteners 19 such as screws or the like. The forward portion of the casing walls 16 terminate in spaced relation from the top wall 8 of the base structure 7 and are provided with inwardly directed flanges 20 extending parallel with the wall 8. The rear portion of the top wall 15 is flanged as at 21 (FIGURE 1) to which is affixed a rear wall 22 by means of a series of threaded fasteners 23 arranged in suitably spaced apart relation. Similarly, the forward edges of the side walls 16 are provided with inwardly directed flanges 24 to which is affixed a front wall panel 25 by means of threaded fasteners 26. The front wall panel 25 is obliquely bent to extend rearwardly as at 27 and provide a horizontal flange portion 28 adapted to cooperate with the flanged portions 20 on the side walls 16 to support a glass panel 29 arranged in vertically spaced relation from the wall 8 of the base 7.

The forward edges of the side walls 16 above the panel 25 are inclined rearwardly and secured to said edges in a pair of opposed angle members 30 which are held in place in any approved fashion, as by means of welding or the like, and the extreme forward edge of the side walls 16 are provided with inwardly directed flanges 31 to form opposed vertical channelways for slidably receiving a semi-transparent panel 32 formed of frosted glass, and adapted to provide a screen upon which the picture image is adapted to be projected.

The top wall 8 of the base 7 is provided with an opening 33 having a marginal flange 34 for supporting a stage or the like 35 formed of glass or other transparent material. The top of the base 8 provides a relatively large surface for the insertion and removal of work sheets S such as index cards or other business forms having identification data such as fingerprints or the like, and the top wall 8 of the base 7 is spaced from the side walls 16 of the casing as at 36 to provide a relatively deep slot 37 extending transversely of the casing, as well as longitudinally thereof. The lower edges 36 are provided with inwardly directed flanges 20 (FIGURES 1 and 2) with a portion of the flanges supporting the glass panel 29 and the rear portion thereof arranged to support an angular strip 39 having an upstanding portion 40 secured thereto by means of a suitable series of threaded fasteners 41. The upper end of the vertical portion 40 is bent to extend obliquely as at 42 and is provided with flanged end portions 43 secured to the side walls 16 in any approved manner.

The vertical wall 40 is provided with flanged ends 45 (FIGURE 4) which are welded or otherwise secured to the casing side walls 16. The central portion of the vertical wall 40 is provided with a circular opening in which is fitted a lens mount 46, and said mount is provided with an annular flange 47 which is affixed to the wall 40 by machine screws or the like arranged in circumferentially spaced relation. Secured to the flange 47 is an angular prism support which includes a ring-shaped member 48 secured to the flange 47 by machine screws 49. The ring-shaped member 48 is provided with an opening 50 concentically arranged with respect to the optical axis of the lens mount 46. Secured to the lower portion of the ring shaped member 48 is a forwardly extending prism seat 51 having a square opening 52 (FIGURES 3 and 4) arranged in the same plane as the top wall 8 of the base 7. The angular portion 51 of the ring-shaped member 48 is constructed to provide a seat surface for an achromatic objective magnifying lens 53 supported in a suitable mount 54 which is secured to the angular portion 51 of the prism support by means of a series of circumferentially spaced machine screws 56 which extend through suitable openings in the ring-shaped lens mount 54, and are received in correspondingly threaded openings 57 in the angular portion 51.

A penta-roof prism 60 is supported agianst the ring-shaped member 48 and the angular seating portion 51 thereof, and said prism is provided with a front face 61 providing a wall surface in registry with the opening 50 and normal to the optical axis of the lens mount 46. In addition, the prism 60 is provided with a mirrored wall surface 62 which extends obliquely to the transparent wall surface 61, and arranged at an obtuse angle to the mirrored wall surface 62 is a flat mirrored wall surface 63. Extending upwardly and forwardly from the angular portion 51 of the prism supporting member is a mirrored roof surface 64 which merges with the flat mirrored roof surface 63 along diagonal corner edge portions 66 (FIGURE 2). Thus, the mirrored prism roof 64 provides mirrored angular surfaces 67 which merge with opposed prism side walls 68.

The roof prism 60 is further supported by angle brackets 69 having flanged portions 70 which are secured to the ring shaped supporting member 48 by suitable threaded fasteners 71, and said angle brackets 69 are shaped to conform to the side walls of the roof prism 60 to completely close and support said prism. The lower edges of the angle brackets 69 are provided with foot portions 74 which are supported on the angular porton 51 of the ring shaped support 48. It is to be noted that the roof prism 60 is slightly offset forwardly on the optical axis of the objective lens 53, with its lower transparent wall 74′ spaced from the plane of said objective lens 53. Slidably mounted in the lens mount 46 is a lens holder 75 in which is affixed a plano-convex lens 76. The lens holder 75 is adapted to be adjusted along the optical axis of the projecting lens 76 by means of a control shaft 77 which has one end extending through a suitable bearing opening in the left hand wall 16 of the casing, and is provided with a knurled knob 78 held in place by means of a set screw 79. A retaining collar 80 is also mounted on the control shaft 77 and is held in place by means of an Allen screw or the like 81. The opposite end of the control shaft 77 has affixed thereto a disc-like member 82 which is received in a correspondingly shaped opening 83 formed in the lens mount 46. The lens carrier 75 is provided in its peripheral wall with an opening 84 adapted to receive an eccentric pin 85 carried by the disc-like head 82. Thus, when the control knob 78 is rotated in either direction the lens holder 75 will be adjusted along the optical axis of the lens mount 46, and the image rays projected from the roof surfaces 67 of the roof prism will be focused on a mirror 88 mounted adjacent the rear wall 22 of the casing 5. The mirror 88 is supported on an angle bracket or plate 89 having a foot portion 90 which is adjustably connected to the top wall 8 of the base 7 by means of a screw and slot connection 91 (FIGURE 1). The mirror 88 is secured in place by spaced apart clamps which are held in place by screws 93 so that the flanged portions 92 of the clamping members will overlie the opposed edges of the mirror 88 and securely hold the same in position. It will thus be seen that the reflected image rays from the roof prism 60 will be directed toward the mirror 88 as shown by the arrows in FIGURE 1, and the image will be refletced and projected onto the screen 32.

In order to illuminate the object under examination on the top wall 8 or stage 35 a pair of lamp brackets 94 are secured to the vertical wall 40 by suitable threaded fasteners 95, and said bracket 94 is adapted to support the base 96 of a lamp socket 97. The lamp socket 97 is secured to the angle bracket 94 by threaded fasteners 98 and the socket 97 is of the bayonet type adapted to receive the base 99 of reflector-type electric bulbs 100 which are constructed to direct a highly concentrated beam of light in the direction of the work sheet S on the stage 35. As shown in FIGURE 2 a reflector-type lamp bulb 100 is mounted on each side of the lens prism system, and in lateral alignment with the objective lens 53. The socket base 96 of each lamp socket is provided with conductors 101 and 102 and are adapted to be energized from a suitable source of electrical energy.

As shown in FIGURE 6 a step-down transformer 103 has its primary winding 104 connected to a source of electrical energy diagrammatically illustrated as at 105 by conductors 106 and 107. A suitable snap switch or the like is interposed in the conductor 107 as at 108, and is arranged on the side of the casing wall 16 as shown in FIGURE 1. The secondary winding 109 is connected to a rheostat 110 of the variable type by a conductor 111, and a movable contact arm 112 is connected by a conductor 113 to the conductors 101 of the reflector lamps 100. The other side of the secondary winding 109 is connected by a conductor 114 to the conductors 102 of the reflector lamps 100, and when the switch 108 is closed the arm 112 may be regulated by means of a control knob 115 secured to the rheostat arm 112 by means of a set screw 116 so that adjustment of said arm will increase or decrease the supply of electrical energy to the filaments 118 of the reflector bulbs 100.

Thus, when a solid index card or business form sheet S is placed upon the top wall 8 within the slot 37 of the casing and beneath the transparent panel 29, the light rays from the reflector lamps 100 will be directed thereon and the image rays will be projected upwardly through the objective lens 53, and will then be reflected by the mirrored surface 62 of the prism 60 to invert said image which will be reflected toward the surfaces 67 of the mirrored roof prism portion 64 where they will be laterally reversed and projected through the projector lens 76 onto the screen 32 after being reflected by the plane mirror 88. Thus, the illuminated image of the data on the sheet S is magnified and projected in an upright position on the screen 32. It is to be noted that the sheet S is inserted in the slot 37 with the data or printed matter surface uppermost and right side up, so that the operator can read portions of the sheet corresponding to the matter thereon to be viewed on the screen 32 such as a series of fingerprints or other identificaiton markings.

By employing a roof prism 60 an objective lens having greatly increased magnification can be used due to the increase longer optical distance, and in addition it is not necessary to provide complicated reversing lens systems to project the image on the screen 32 in an upright position.

The side wall 16 of the casing 5 can be provided with a series of graduation marks 140 with which a pointer 141 on the rheostat knob 115 cooperates, and said scale 140 may be graduated with suitable legends (not shown) to indicate values of illumination.

Mounted beneath the wall 8 and supported thereby is a U-shaped bracket having upwardly extending arms 150 which are welded or otherwise secured to the under surface of the wall 8 on opposite sides of the transparent stage 35. The base 151 of a lamp socket 152 is supported by said bracket and said base is mounted directly beneath the window opening 33 (FIGURE 2) of the transparent image bearing supporting member 35. A reflector lamp 153 is provided with a bayonet base which is received in the bayonet socket 152 and the lamp base 151 is provided with conductors 155 and 156. The conductor 155 is adapted to be connected to an electrical current source such as the alternating current source 105 described in connection with the diagram in FIGURE 6. The electrical conductor 156 is connected to a snap or toggle switch 157 as at 158, and the toggle switch 157 is provided with a threaded extension 160 which is secured in an opening in the side wall 9 of the base 7 and held in place by threaded bushing retainers 161 and 162. The actuating handle 163 of the switch 157 is adapted to be manipulated from the left hand side of the viewing apparatus, and the electrical conductor 164 is connected to the other side of the source of electrical energy to complete a simple series circuit.

The side walls 16 of the housing 5 are provided with a series of ventilating openings 166 in the area of the lamp housing to permit air circulation therethrough and eliminate overheating of the reflector bulbs 100, and prevent the burning out of the incandescent lamp filaments.

In operation, the viewing apparatus is placed on a desk and the operator can be seated closely to the translucent screen 32 of the inclined window opening so that his eye E is located in approximately the position shown in FIGURE 1. Let it be assumed that the operator desires to compare a series of fingerprints or the like on a business index card S having fingerprints thereon or other image bearing matter. The card S is inserted in the slot 37 and supported on the top wall 8 of the base 7 so that the image bearing material to be inspected is centered with respect to the optical axis of the lens 53. The switch 108 is then operated to energize the reflector incandescent lamps 100 so that the image bearing material on the card is illuminated. Actually, the switch may be operated prior to insertion of the sheet S, or may be operated with each inspection to increase the life of the reflector bulbs. The reflector bulbs are arranged on opposite sides of the optical system and are adapted to project concentrated light beams on the image bearing material of the sheet S. The image bearing light rays pass upwardly through the spherical plano-lens 53 and then follow a circuitous course or pathway being reflected by the frosted mirror surface 62 of the prism 60 and then reflected back toward the roof prism 64 and the surfaces 67 where the image is reversed laterally and directed toward the projection lens 76 in the direction of the mirror 88 where it is reflected and appears upon the inner surface of the translucent frosted viewing panel 32.

The fingerprint image or the like will be greatly magnified, and can be focused by manipulating the knurled knob 78 which moves the projecting lens carrier 75 along the optical axis of the lens and produces a clear and distinct image of the image bearing material on the card S. It is noted that the prism assembly 60 is mounted between the collecting or magnifying objective lens 53 and the projection lens 76, which increases the focal length of the lens 53 but permits the same to be mounted in close relation to the transparent stage 35 and plane of the base top wall 8.

When it is desired to view transparent objects such as slides and picture strips, the reflector lamps 100 are extinguished by moving the toggle switch 108 to its "off" position, and the toggle switch 157 is operated to close the series circuit through the reflector lamp 153 and the source of alternating current (not shown). After the lamp 153 is energized the transparency may be positioned and supported on the transparent stage 35 so that the light rays project an image ray toward the lens 53. The picture image is then projected onto the translucent screen 32 and is greatly enlarged and magnified so that various details thereof can be studied.

It will thus be seen that the viewing apparatus and projector provides a compact structure for comparing and viewing fingerprints and the like on an image bearing card, with the fingerprints on the uppermost side of the card with the image material in a proper reading position and to project an image of said fingerprint onto the translucent screen 32 with the image arranged in an upright position corresponding to the position of the image bearing material on the sheet S.

Since the illuminated image changes direction twice and is reversed laterally in the roof prism 60, the focal length of the magnifying lens 53 is considerably increased and the image can be focused on the translucent screen 32 by the movable projection lens 76 after the same is adjusted properly by the control knob 78.

It is to be understood that the present disclosure of the invention is a preferred embodiment thereof, and that various changes in the shape, size and arrangement of parts may be resorted to without departing from the spirit of the invention or the scope of the subjoined claims.

In lieu of the translucent screen 32 a Fresnel type screen can be employed to increase the image brightness, and such screens are commonly used in present day optical devices and include a series of concentrically arranged stepped rings or annular projections formed by concentric grooves.

What I claim is:

1. In a projecting apparatus, a base having a top wall, a casing mounted above said base in spaced relation therefrom to form an entrance slot for receiving image bearing material in face up relation with the top wall of said base forming a support for said material, a screen mounted in a window opening in said casing above said slot directed upwardly and rearwardly, illuminating means above and below said slot for optionally viewing transparent and opaque material, a lens mount in said casing above said base, a collecting lens in said lens mount arranged in spaced relation with respect to said base top wall, a penta-roof prism mounted above said collecting lens for reflecting the image rays from said material and reflecting the same through a vertical wall of said prism, a second lens mount arranged normal to said first mount and in front of said prism vertical wall, a projecting lens in said second lens mount for projecting image rays from said prism, a control shaft extending through said casing, an eccentric pin on said control shaft received in an opening in said lens mount for adjusting said projecting lens along its optical axis in a direction toward and away from said prism, and a reflecting mirror in said casing at the rear thereof for projecting the image rays on said image bearing material on said screen in an upright and non-reverted position.

2. In a projecting apparatus, as set forth in claim 1, in which said illuminating means includes circuts including a source of electrical energy, and selective switch means for optionally energizing the illuminating means above and below said slot.

3. In a projecting apparatus, as set forth in claim 2, in which said circuit includes a rheostat.

References Cited by the Examiner

UNITED STATES PATENTS

| | | | |
|---|---|---|---|
| 1,842,855 | 1/1932 | Benard. | |
| 2,310,273 | 2/1943 | Bancroft | 88—240 |
| 2,551,482 | 5/1951 | Wolk | 88—24 X |
| 2,899,860 | 8/1959 | Scott et al. | 88—27 X |

FOREIGN PATENTS 908,967  11/1945  France.

OTHER REFERENCES

German application 1,076,965, printed March 3, 1960.

Jacobs, D. H.: Fundamentals of Optical Engineering, N.Y., McGraw-Hill, 1943—pages 160–161 relied on.

NORTON ANSHER, *Primary Examiner.*

WILLIAM MISIEK, *Examiner.*

R. D. MUHL, VANCE A. SMITH, *Assistant Examiners.*